United States Patent
Snyder et al.

(10) Patent No.: US 8,705,139 B1
(45) Date of Patent: Apr. 22, 2014

(54) METHOD FOR CREATING HIGH RESOLUTION PRINT MEDIA

(75) Inventors: LaDonna Snyder, Lubbock, TX (US); Brandon Snyder, Lubbock, TX (US); Christopher Hopper, Lubbock, TX (US); Mitchum Lee Owen, Thousand Oaks, CA (US); Jeff Rader, Lubbock, TX (US)

(73) Assignee: Premier Interactive, Inc., Lubbock, TX (US)

( * ) Notice: Subject to any disclaimer, the term of this patent is extended or adjusted under 35 U.S.C. 154(b) by 1223 days.

(21) Appl. No.: 12/578,728

(22) Filed: Oct. 14, 2009

Related U.S. Application Data

(60) Provisional application No. 61/110,024, filed on Oct. 31, 2008.

(51) Int. Cl.
*G06T 5/00* (2006.01)
*H04N 1/407* (2006.01)

(52) U.S. Cl.
USPC ........... 358/3.27; 358/1.15; 358/1.9; 358/3.3; 358/3.2; 358/2.1; 700/132; 703/6; 705/26

(58) Field of Classification Search
USPC ............... 358/3.27, 1.15, 1.9; 700/132; 703/6
See application file for complete search history.

(56) References Cited

U.S. PATENT DOCUMENTS

| | | | |
|---|---|---|---|
| 6,895,557 B1 * | 5/2005 | Wood et al. | 715/744 |
| 2006/0044599 A1 * | 3/2006 | Lipowitz et al. | 358/1.15 |
| 2009/0222127 A1 * | 9/2009 | Lind | 700/132 |

* cited by examiner

*Primary Examiner* — Quang N Vo
(74) *Attorney, Agent, or Firm* — Buskop Law Group, PC; Wendy Buskop

(57) ABSTRACT

A method for creating a high resolution print media using a display resolution screen image approval process, web-based ordering, web based checkout and payment, by an unskilled user to create a message of pre-process data and a display resolution image for rendering a high resolution image on a substrate.

8 Claims, 4 Drawing Sheets

METHOD FOR CREATING HIGH RESOLUTION PRINT MEDIA

CROSS REFERENCE TO RELATED APPLICATION

The present application claims priority and the benefit of co-pending U.S. Provisional Patent Application Ser. No. 61/110,024 filed on Oct. 31, 2009, entitled "METHOD FOR CREATING HIGH RESOLUTION PRINT MEDIA". This application is hereby incorporated in its entirety.

FIELD

The present embodiments generally relate to an on demand method to print on line by a consumer, an unskilled user, to create banners, yard signs, aluminum signs and adhesive vinyl signs through a coordinate based web application which enables design, payment and processing in only a few days. The method also prevents fraud and reduces risk by a corporate unskilled user in creating print media that infringes copyrights or trademarks of other business organizations.

BACKGROUND

A need exists for a method that easy to use to create large and small print media on a variety of substrates, such as T-shirts, mugs, banners and billboards by unskilled, untrained users without the need for a designer or commercial artist.

A further need exists for a system that is easy to provide to a production printer for fast turn around and procurement.

The present embodiments meet these needs.

BRIEF DESCRIPTION OF THE DRAWINGS

The detailed description will be better understood in conjunction with the accompanying drawings as follows.

Figure 1:
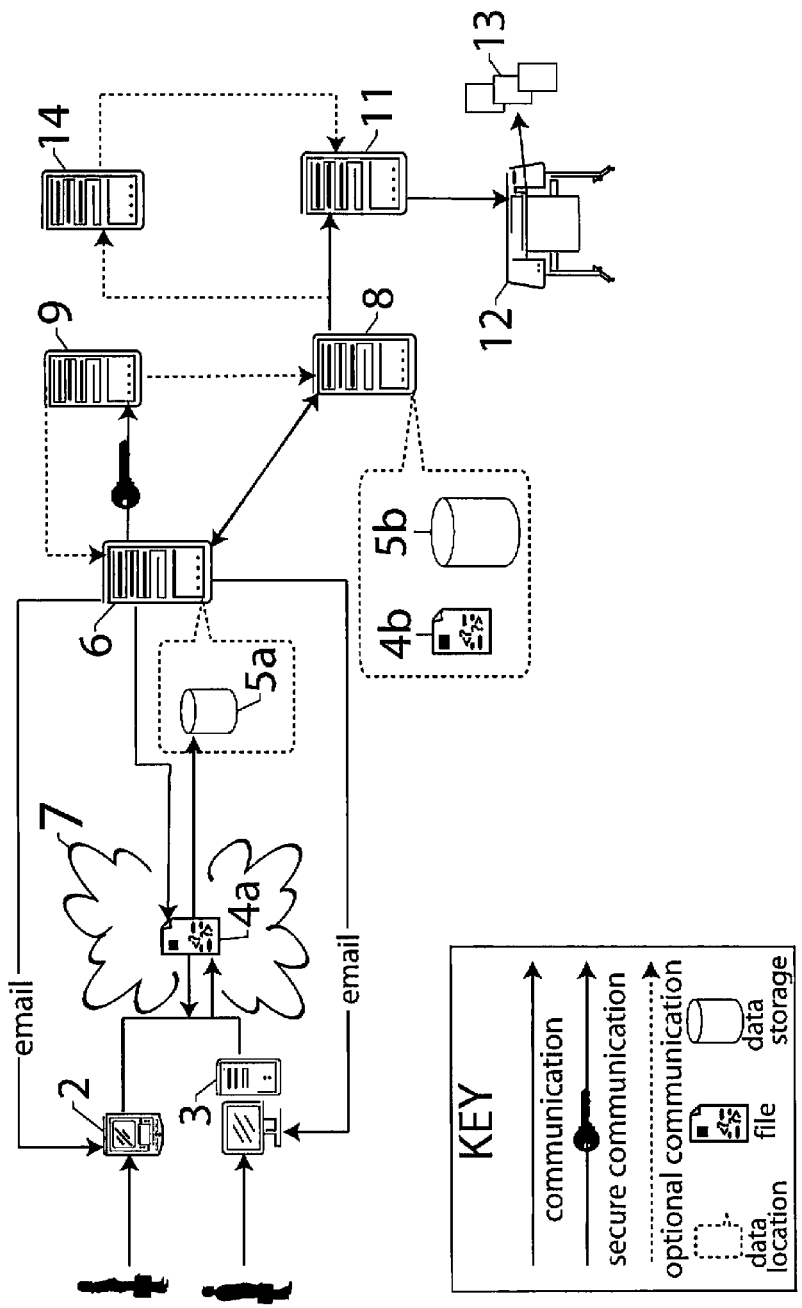
FIG. 1 is a diagram of the system used to implement the methods of the invention.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a user driven method for creating a high resolution print media using a display resolution screen image approval process, web-based ordering, web based checkout and payment.

The embodiments enable an unskilled user to create high resolution print media, to the level of a high end design agency or a high end advertising agency using a variety of pre programmed graphics, tools that enable customization of the preprogrammed graphics, where are referred to herein as "message elements", and tools that enable an unskilled user to upload the unskilled user's message elements, which can be photographs, text, vector based objects, with only a few clicks.

The message elements can include the use of a preprogrammed audio chip, with music, text, or other sounds, and can further include the use of smart cards which can contain embedded chips in printable plastic cards.

The method enables an unskilled user, corporate user or other business user to create print media, online and simultaneously upon creation, pass the print media to legal and compliance authorities for authorization and review for quick email, online interaction to prevent infringement and fraud, and compliance with corporate or other legal advertising rules while creating the print media for fast authentication and verification that the created print media will not infringe other user's trademarks, copyrights, or design elements, or constitute palming off in essentially a one way communication, from the user, to the legal authorities, to the print production house if the created message complies with legal regulations and other rules.

The method additionally enables the unskilled user to interact in two way communication with designated third parties, including a private party attorney, or an officer of a business that the unskilled user is involved with, or another control agencies, such as ASCAP, BMI, or other regulatory and licensing bodies to on line, and on demand, create new media with licenses and otherwise prevent fraud or misuse of intellectual property or other property including music and artwork of others.

In an embodiment, the invention contemplates that an unskilled user can operate a system that creates a high resolution print media which contains "message elements" using a coordinate based system that can utilize Adobe Flash™ and JavaScript™ within a web browser, and a web server that can enable the user to create a high resolution image while viewing a display resolution screen image and simultaneously or at least concurrently create a pre-press report that can include the high resolution data needed to provide a high resolution full scale copy of the low resolution display resolution screen image by using a first processor that can communication with an administrator processor, that can also be referred to herein as a second processor. Both processors can be connected together through a network, such as the internet.

In an embodiment, the invention contemplates that a modular interface that can be referred to herein as the "PrintFX", "PFX interface" or "PFX module" can be customized for industry distributors and provide brand specific marketing tools for their clients. The method and associated system can provide a platform that enables the unskilled client to create customized promotional items within brand identify through the modular PFX interface available through a distributor. The system and method can enable the unskilled user to design print media that can include floor graphics, such as for carpets, window clings, which can stick to car windows, custom printed apparel and offset print.

Through a series of tutorials and a virtual sales person, the interface can provide to the unskilled user sufficient technical and design information to aid all end user experience levels. The virtual sales person (VSP) can provide an introduction to new customers and serve as a walk on help animation enabling the method to be exceptionally user friendly and usable in less than about 3 minutes to about 5 minutes for each step. The tutorial series can show the unskilled user how to create art, how to customize art and other message element, to create an effective message using the PFX module.

The system for implementing the method is represented in FIG. 1.

The term "print media" as used herein, can include architectural cut outs.

The term "unskilled user" as used herein can refer to a user that may not have any computer skills or print design skills. This term does not exclude skilled users but specifically directs this program and method to users without computer talent, generally older than 18 years of age.

The term "display resolution screen image" refers to an image with a resolution that can be appropriate for viewing on a display device, such as a user's cell phone, a user's computer monitor, or similar device.

The term "first processor" can refer to the web server of an administrator.

The embodiments relate to a method for high resolutions print media between about 50 dpi to about 300 dpi, and can be for cut files and full files The term "engraving" as the term as used herein can include routing.

The term "orientation" as used herein can include rotation.

Turning now to FIG. 1, a first unskilled user (1a) can walk up to a kiosk (2) and a second unskilled user (1b) can log onto a website using a home computer (3) to access the online on-demand web application which comprises a first set of computer instructions (4a) in a first data storage (5a) associated with a first processor (6). The kiosk (2), home computer (3) and first processor (6) can be connected together using at least one network (7) which can be the Internet. Other devices can be used besides kiosks and home computers to access the web application, such as cellular phones, PDAs, or other similar devices, including but not limited to an iphone™. Other networks besides the Internet, such as a LAN, and multiple networks in communication with each other are contemplated as usable herein. For example an unskilled user can log into a second network, that can be the Internet from a cellular network using their Blackberry™

FIG. 1 shows that the first processor (6) is also in communication via the network (7) with a second processor (8) with a different second set of computer instructions (4b) in a second data storage (5b) associated with the second processor (8). The second processor can be located at either an administrator location or possibly at a print production facility.

FIG. 1 also shows that the first processor (6) can communicate back, such as with an email or an instant web-based communication, such as tweets or instant messages, to the unskilled user via the network and to a financial processor (9) such as a bank's debit card processing computer or a credit card processing facility processor which processes any financial payment information provided by the unskilled user using the on-line on-demand print media, and this financial processor can then communicate to the first processor, the second processor, and even a production processor (11) and financially fund the order created by the unskilled user enabling a print production facility (12) to actually print the message elements created through the web interface on the desired substrate by the user forming the print media (13). The completed print media can then be shipped to the user, or can be picked up by the user.

The embodiments also contemplate that the first processor can transmit to a compliance processor (14) which can review the message elements created using the first processor (6) prior to the message elements being transmitted to the production processor (11). The compliance processor can contain computer instructions to review message elements without human interface, or it can have a compliance person review the message elements prior to final creation of the print media using this on-line on-demand system.

Figure 2:
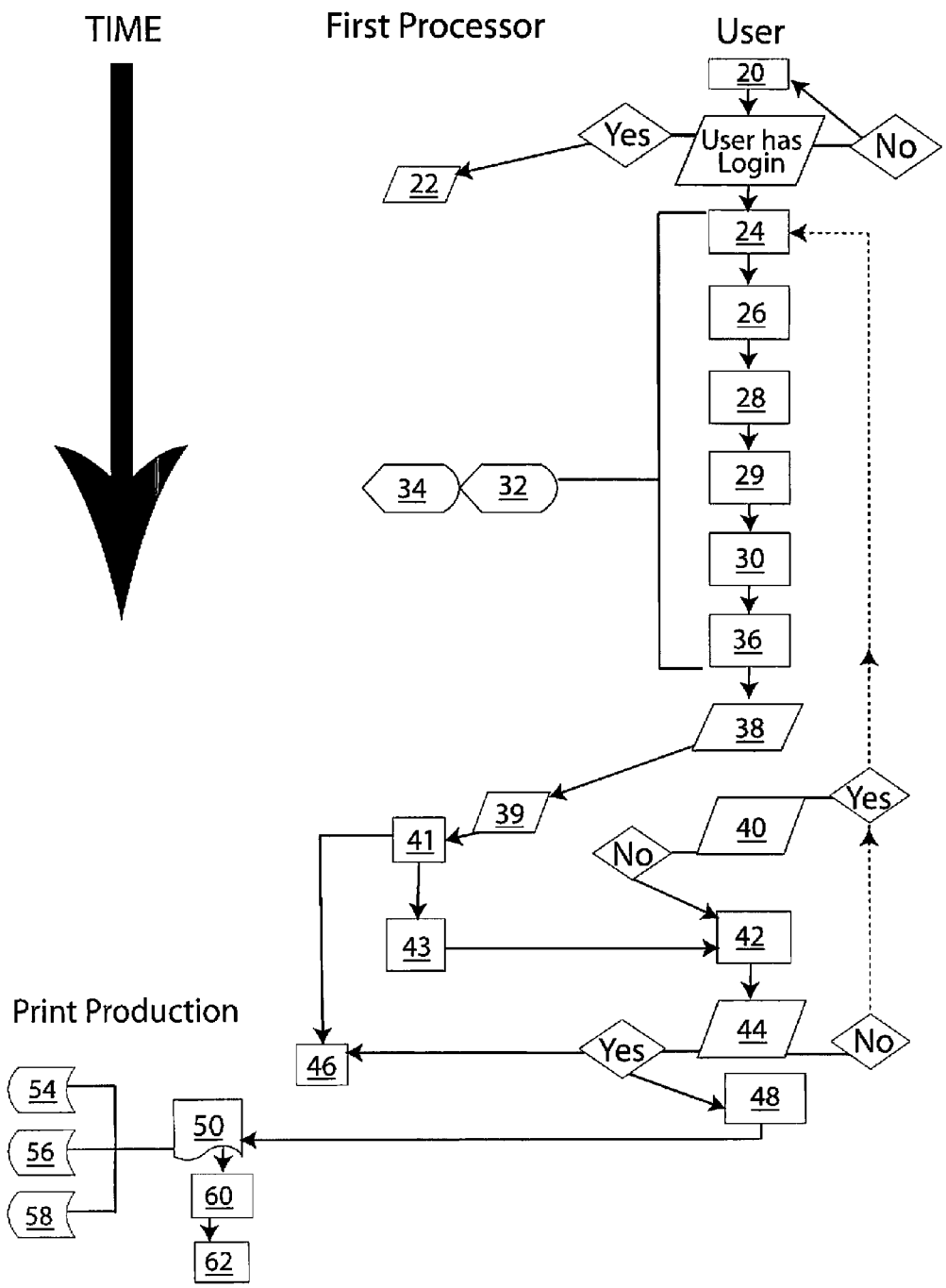
FIG. 2 is a flow diagram of steps used in the method of the invention.

FIG. 2 is a flow diagram of an embodiment of a method of the invention.

The method can allow distributors of print media to add content to their entry page through which the unskilled user accesses the web application. The embodiments, contemplate that an unskilled user can go to their favorite printer's web site, log into their web site, and then access the on-line modular interface application, which can be PrintFX, PFX interface or PFX module, for creating their desired high resolution message using low resolution viewing, and no actual design skills and no actual computer print shop, or illustrator skills.

In an embodiment there can be as many as 5 user levels, the administrator that hosts the website and processors, a broker or salesperson that owns the kiosk, the user, who can have the corporate computer or the home computer, and a distributor that can host a related site with a hyperlink. The administrator can create various settings that can be customized for each distributor, such as lists of usable substrates for printing, and certain icons for certain distributors. For example, a certain distributor can use all of the Busch brewery logos and icons for select unskilled but authorized users of the web based application, which can be a modular interface, such as PrintFX, PFX interface or PFX module.

The distributor can set second level pricing which can not set below base pricing, and manage current specials on substrates, manage "html" content, manage salesperson and customer account information, and manage shipping and billing issues.

The broker and salesperson can set third level pricing which can not set below second level pricing.

The customer profile/account can have no administrator privileges. Customers which are termed herein as "unskilled users" can further create a log in which is stored on the administrator server, the second processor's associated data storage. The system and the method are contemplated to be usable by between about 2 users to about 100,000 or more users at any given time.

Billing data and customer "unskilled user" and distributor information can be kept for reference and shipping and the entire system can also be contemplated to be encrypted once the user logs into the system for high safety and prevention of identify theft information. Customers can access their previous creations for reorder purposes.

FIG. 2 provides more detail of this method, which can contemplate that as a first step a unskilled user visits the website (20). If the unskilled user is new, the unskilled user creates an account, and if the unskilled user is a repeat user, then the login is authenticated (22).

The unskilled user can be able to view a "my account" screen to check order status, view purchase orders, change account and billing information and review previous signs. Brokers and distributors can have access to the unskilled user's billing information and purchase orders. Distributors can have access to salesperson purchase orders for records and provide to the administrator with monthly purchase order reports. Additional reports can be provided, such as weekly, bi-weekly, quarterly and annually.

The method contemplates that a reporting element can show pricing components for the substrates and the order that can refer to records for a specific date range and include shipping records and other information to stream line the distributors pricing process without the administrator's direct involvement. Additionally, SSL certification and additional security features as well as profit tracking and pricing reports can be contemplated to be within the scope of the invention. The interface's interaction can make use of these data elements to provide accurate records and communication.

The method can additionally contemplate that an administrator of the second processor can manage a database of substrates with detailed specifications for use as the print media supporting the message elements.

In this method, the unskilled user selects a product family (24).

The user then selects substrate product for the actual printing, forming the print media (26), such as T-shirts. The unskilled user can then input the substrate dimensions (28). Some examples of substrate dimensions can be a child's small and men's extra large. If the substrate is a banner, the dimensions can be 5 feet by 10 feet on webbing.

The next step can be inputting message elements (29) which are described in more detail in the subsequent figures. The message elements can be prepared on the unskilled users interface and sent to the first processor upon completion of the design.

The message elements can be at least one vector element, at least one text element, at least one high resolution clip art, at least one high resolution 2D image, at least one high resolution predesigned, preloaded graphic back, at least one unskilled user uploaded image or combinations thereof. The substrate can limit the message elements to a predetermined group of message elements.

The user can then adjust the message properties (30), by size, shape, orientation, rotation or a variety of other choices.

The user then can input the quantity of print media to be formed (32).

The unskilled user can be presented with price adjustments based on the quantity selected (34).

The unskilled user can select finish out options (36) such as hems, grommets and then press "order" (38). The web application then can flash write (39) the message elements, which can be done when Adobe Flash writes to a low resolution message. The unskilled user can design additional products (40), and the low resolution proof can be redrawn (41) to accommodate changes desired by the unskilled user after viewing the low resolution display image proof created in step (43).

The unskilled user can then move to the check out process (42) and a proof can be written to HTML or PDF for immediate review (43).

The unskilled user can then approve (44) the low resolution message and the first processor can send approvals to the production company (46). The created message can then be confirmed (48), a production file can be created (50) and then the high resolution full scale image can be made (50).

Additionally the method can contemplate that unskilled user's art can be stored in an art database (54), user data can be stored in a user data database (56) and customer number data can be stored in a customer number database (58).

Production is started as step (60) and the print media is formed as a completed product in step (62).

The method can further contemplate that a unskilled user can log into the software from a kiosk networked to the Internet and to an administrator, or via a cell network and use the flash application that accepts parameters from a user detailing the desired product line that is to be used for the base of a design. These parameter can include the size, the number of compatible colors for clip art and the embellishments, hem, grommets, or any combinations thereof.

The design module can yield a design as data instructions which can be responsible for interpreting instruction recreating the design on the processor, saving the design in the necessary format, attaching it to a user's account and otherwise manipulating the designs. The data instructions can be written in JSON or XML, but additional formats can be used.

The coordinate grid can be displayed on the low resolution image to ensure correct production layout.

This method further contemplates that a unskilled user can log in with a user name and password. A personal identification number can also be used.

For desktop applications, the user can be provided a license key for each individual use for a time specific.

An account can be created upon log in and can reflect the last name of the user, first name of the user, middle name of the user, password, company name, if any, residence address, business address, phone, fax, email address, cell number, corporate compliance officer name, if any, corporate compliance officer email, phone and address, a franchisee compliance officer if any, and other individuals who would need to review print media to confirm proper use of trademarks, names, logos, colors, and other firm branding, and to confirm that licenses are in place to use copyrighted materials of others.

Site navigation can be located on each page used in the method, so that a unskilled user can change their product in the middle of what they are doing or navigate back to the home page if they so choose.

For example, outdoor products can have a list of substrates, like flooring. Indoor products can be and indoor sign on paper. Apparel can be a substrate, such as a T-shirt.

Figure 3:
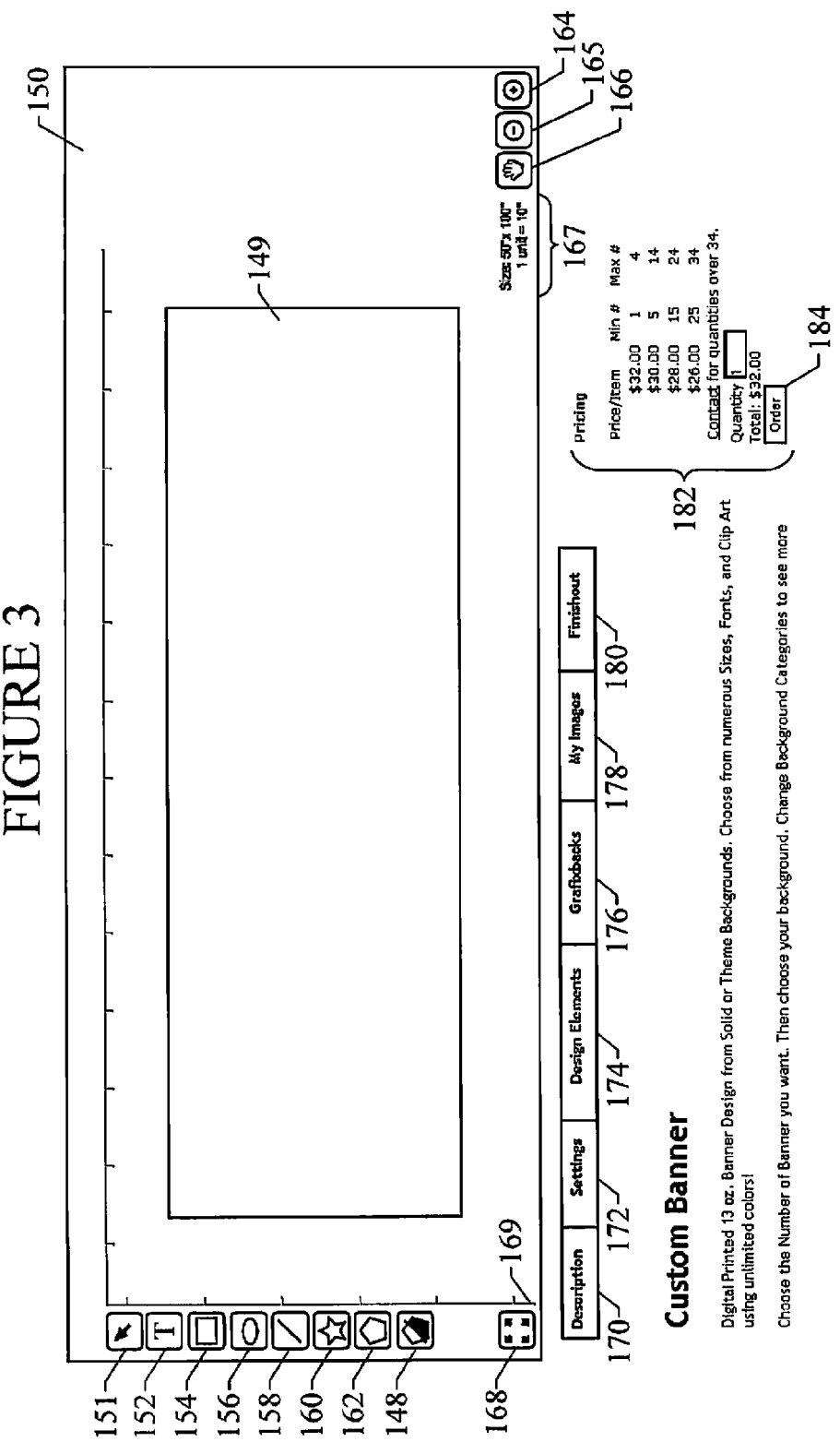
FIG. 3 depicts an embodiment of a first web based design page and tool buttons that the unskilled user can manipulate to design and order print media.

The screen shot of FIG. 3 shows that the unskilled user can select a substrate from a listing of substrates (100). The embodiments contemplate that each substrate is described in more detail in a library, which can be resident in the data storage of the second processor, or in the data storage of the first processor. The library of substrate specifications, and characterizes can be shown as the button "description" (170). For example, if the unskilled user picks "custom banner" and then clicks on button "description (170), the library can pop up a box that provides details, such as "custom banner is a 13 oz banner, with an open weave good for temperatures ranging from −10 Fahrenheit to 109 Fahrenheit.

The method enables the unskilled user to select one from a list of possible substrates. Substrates can be materials like paper products, posters, business cards, T-shirts, films, folders, pamphlets, polymers, materials to be engraved or etched. Other substrates can be magnets for cars, banners, such as vinyl or paper banners, floor graphics, wind mesh with about 40 percent to about 60 percent holes in it to let snow blow through, and so on. Another substrate can be a pressure sensitive adhesive, such as a vinyl. The substrates can be fabric, woven, nonwoven, and carpets. Canvas, poplins, silks, and other flame resistant materials, wallpaper and borders can be used as substrates, particularly if the material is on a roll. Polystyrene can be used as a substrate in the process.

For example, if a custom banner is selected, then the unskilled user is shown a "design screen". On the design screen, there can be navigation buttons, objects buttons, and an image of the selected substrate and a box for inserting the elements of the message.

FIG. 3 shows an exemplary "design screen" with design area (149) with a canvas (150), with a pointer (151) object button, which can be presented by the first processor when the user logs into the system or operates the program.

Also shown is object button "T" (152) which can be a text button for inserting text.

FIG. 3 further shows a square/rectangle button (154) for inserting and customizable expandable square by changing color, transparency, rotation or size. The next button can be a "circle" or ellipse button, (156) which like the square/rectangle can be customizable and allow the object to be inserted in the design area (149). The circle and square can be sized differently, located in different position, each can have different stroke colors, different fill colors and different transparencies. Stroke thickness can also be varied and produce a customized item within the design area. For the rectangle, there can be corner radii options, to create rounded rectangles.

A line button (158) can act as a vector element for insertion into the design area. With each element are options, such as the line button can have the option to set size, position, orientation, color and transparency, line thickness, and dash properties. Lines can be straight, squiggly or corkscrews.

A star button (160) has the ability to have different sizes, shapes, orientations within the design area. The star button can also have different star point numbers, and offer the unskilled user different radii, and line thickness. The outer radii can also vary.

A polygon button (162) button can have fewer features as described for the star button, but in additional embodiments, the polygon button can have all the features of the star button.

A used color replacement button (148), which is a color switching tool, that can allow an unskilled user to replace all occurrences of a given color with another color, which can be a provided list.

A zoom in button (164) can allow the unskilled user to zoom in to the design area and zoom out button (165) can allow the unskilled user to zoom out of the design area. The hand button (166) can allow the unskilled user to move the substrate and its design within the flash application.

A full screen button (168) can allow the unskilled user to toggle between a full screen view and a view showing the URL.

Also in FIG. 3, are some of the message element choices. Button (170) is the "description" button which can have detailed specifications of the different substrates.

Setting Button (172) is termed "settings" which can give sizes for the selected substrates. Different substrates are given different size options, and different printing options, such as one sided or two sided, colors, or even substrate thickness or weight. Other non-design substrate settings can be inserted under this button, such as woven, non-woven, adhesive on one side, lumpiness and so on.

The method can permit manipulation of various object settings for any of the message elements, such as points on the star, thickness of line, the term "object settings" can refer to these variables if used on a message element.

Other design elements can be shown under button "Design elements" (174) which can include clip art, graphic backs (176) my images button (178) which can include high resolutions 2D images. Button "Finish out" (180) can provide the unskilled user the choices of non-hem, grommets, or pole pockets, for selection. In an embodiment, the "finish out" button can be included with the description or settings on the screen, which can be collectively known as "Product Options", for ease of use.

The button "Pricing" (182) can provide a matrix of pricings depending on quantity.

The button "Order" (184) can enable the unskilled user to place the order into a conventional shopping cart, such as those used by Amazon or any additional on-line websites with ordering and purchasing capabilities. Preprocess data can be generated when the order button (184) is depressed, this data can be in JSON or XML format, or textual representation.

Figure 4:
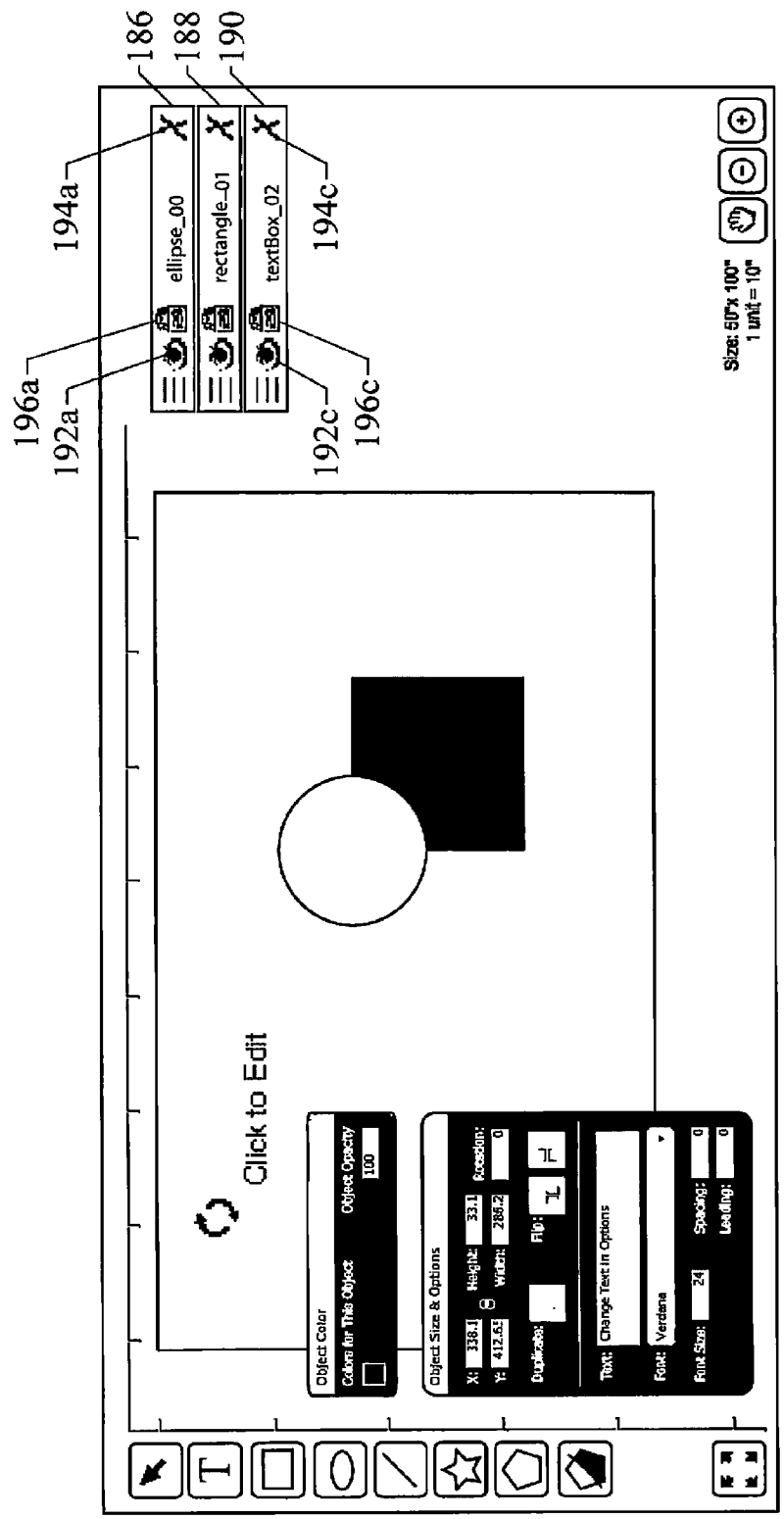
FIG. 4 depicts an embodiment of a second web based design page and tool buttons that can be manipulated by an unskilled user according to an embodiment of the method.

FIG. 4 shows each part of the message being represented by a label. In this Figure each part of the message has an object box that can be dragged to arrange the objects in a front to back order in the message. In this figure the front order begins with element (186) termed ellipse 0, and behind ellipse 0 (186) is rectangle 1 (188). Behind rectangle 1 (188) is textbox 2 (190). Each object box can have controls for "hide and show" which are labeled (192a, 192b, 192c) and each object box can have controls for "delete tool" which are labeled (194a, 194b, 194c). Each object box can have a control to lock the objects so that they can not be moved around on the display area during the design process by the unskilled user. The "lock tools" are labeled (196a, 196b, 196c).

It is possible that if text is inserted, the unskilled user can select font size, spacing of letters, font face, such as arial, college, times, verdana and the like and the text to be displayed. Additionally an embodiment contemplates using italics, bold, underlining and double strike and similar selections with text.

The message as developed in the display area and can have at least one, and potentially, many message elements.

The message of the display area can be stored under the "my images" button.

In an embodiment, a "template button" can be used by an unskilled user to access, modify and store a complete design or image created by a second unskilled user of a different login, which can include layer, color and other message options.

The substrate can create limits to what is in the message. Some message elements may not be usable with certain substrates.

Once the order button is clicked an overall report can be created and the objects can be represented as JSON, XML, or HTML data or as some other text representation. The text data can be rendered into a single image using imaging software. No actual file is created, but the JSON, XML or HTML data is read and a screen image is created, which is a display resolution image.

The display resolution image can then presented to the unskilled user to view. If the unskilled user likes the display resolution image, then the unskilled user clicks "order." The display resolution image can be stored on a processor of an administrator of the method.

The unskilled user can pay a fee using electronic funds transfer, such as credit or purchase order enabling the unskilled user to order rendering of the message in high resolution on the selected substrate with the first processor. The first processor can be a processor of the administrator, such as a webserver connected to the Internet. The unskilled user can log onto the webserver using a PDA, a phone, a desktop, kiosk or laptop, to create the message.

The first processor can transmit an order confirmation of electronic funds transferred and a display resolution image of the message to an administrator, such as by email and to a designated address of the unskilled user.

The first processor can then transmit the pre-process data to a second processor such as a LINUX server, with at least 1 gig of Ram and the same software as the first processor to convert the pre-process data into a high resolution image for rendering on the selected substrate.

The pre-processes data can include co-ordinate data to precisely locate, orient, rotate, and size each message element for the high resolution image. The pre-processes data can further include alpha data to precisely provide opacity for each message element of the high resolution image and color data to precisely provide color when selected, enabling the second processor to construct the high resolution image message element from the pre-process data, while forming a text report to act as a reference point for proofing the high resolution production file.

The high resolution image can be transmitted through a network to a printer appropriate to the selected substrate, such as a grand format solvent based HP Scitex XL1500.

High resolutions digital prints are defined as a minimum of 1440 actual ppi (points per inches) for all offset printing (paper products of less than 3 feet×5 feet in size) and 300 apparent ppi for all grand-format and screen prints (which includes anything larger than 3 feet by 5 feet). Actual ppi is based on output capabilities and is calculated by the print tech on a job by job basis.

Apparent resolution is calculated by the formula ppi/(distance×0.000291)/2. High resolutions is shown in PPI which is Pixels per inch instead of DPI (dots per inch) because the dot size, in nanometers varies form printer to printer, and high resolutions very important in this invention. The pixel per inch value measure the output form the image processor before the print software translates it to DPI.

High resolutions is the ppi based on the viewing distance as shown below in Table 1.

| Viewing Distance | Maximum perceivable ppi |
|---|---|
| 6 | 1145 |
| 10 | 687 |
| 24 | 286 |
| 36 | 191 |
| 60 | 115 |
| 120 | 57 |
| 600 | 11 |

It is possible to use the text report to reference the high resolution image for accuracy before rendering the image on the substrate using the print file.

The high resolution print media can be at least 50 dpi at full scale of the size of the substrate. The embodiments can be used for high resolutions print media between about 50 dpi to about 300 dpi, and can be for cut files and full files.

It should be noted that the message element can have multiple layers of elements. In particular, clip art or graphic back can be adjusted by at least one variable including color and opacity and the corresponding preprocess data can be included in the final output process.

Layer, as used herein is meant to cover at least two message elements stacked on top of each other. If the opacity is adjusted to less than 100%, then the next component part is visible in the stack. These layers are created by adding color control movie clips to a composite SWF and identical layered file, such as a psd or a TIFF file.

The method can further contemplate that the display resolution screen image is no greater than about 75 pixels per inch.

The pre-press report can be provided to a wireless client device.

The method can contemplate that the pre-press report can comprise electronic reports, print reports, and audio reports. The method can further contemplate that the pre-press reports can be transmitted simultaneously to the unskilled user processor and the administrator processor.

In an embodiment, the network can be selected from the group, a satellite network, a fiber optic network, a cellular network, the internet, a LAN, a virtual private network, or a similar network.

The substrates can be offset printing substrates, offset digital printing substrates, screen printing substrates, films, membranes, laminates, substrates for embossing, substrates used for sputtering, etching, engraving, embroidering and combinations thereof The shapes can be adjusted for at least one variables, such as the size of the shape, the orientation of the shape, line thickness used in creating the shape, features on the shape, corner radii, and the number of points on a star.

Vector elements and text elements can depend on how the element is loaded into the file, what resolution is needed, and how the element needs to be enlarged to achieve high resolution.

For example, a check mark can be an image, a clip art, a text element, or a vector image, which can depend on how the image is loaded. Other examples of vector elements can be a shaped objects, such as circles, stars, rectangles, or other polygons.

High resolution predesigned preloaded graphic backs can be layered clip art files wherein each layer controls a single color, a single element, or an alpha channel opacity. Like text element, graphic backs can be loaded like clip art, like a text element, or like a vector image. Graphic backs can be scalable and shrinkable, Substrates can limit the types of message elements based on industry types. For example, in screen printing, substrates can limit message elements to having only a few colors, because the substrate can not support large varieties of color, typically about 2 colors for screen printing for a certain price.

For example, a substrate that can be used for a message that is engraved, the substrate can be limited to only 4 or 5 colors, and not have fades and gradients that a substrate like paper or a thin polymer of 10 mls might.

While these embodiments have been described with emphasis on the embodiments, it should be understood that within the scope of the appended claims, the embodiments might be practiced other than as specifically described herein.

What is claimed is:

1. An unskilled user driven method for creating a high resolution print media using a display resolution screen image approval process, web-based ordering, web based checkout and payment, wherein the method comprising the steps of:
 a. allowing an unskilled user to select a substrate from a plurality of substrates using a first processor, wherein the substrate is a medium capable of accepting a printed image;
 b. allowing the unskilled user to create a message with the first processor, wherein the message comprises pre-process data and a display resolution image;
   wherein the pre-process data is used for rendering a high resolution image on the selected substrate, wherein the message has at least one message element, and wherein the at least one message element comprises at least one:
   (i) vector element;
   (ii) text element;
   (iii) high resolution clip art;
   (iv) high resolution 2D image;
   (v) high resolution predesigned, preloaded graphic back;
   (vi) unskilled user uploaded image; or
   (vii) combinations thereof;
   wherein the choice of substrate limits the message elements to a predetermined group of message elements;
 c. paying a fee using electronic funds transfer by the unskilled user enabling the unskilled user to order rendering of the message in high resolution on the selected substrate with the first processor;
 d. transmitting using the first processor, the display resolution image and an order confirmation of electronic funds transfer to an administrator and to a designated address of the unskilled user; and e. transmitting the pre-process data to a second processor to convert the pre-process data into a high resolution image for rendering on the selected substrate, wherein the pre-processes data comprises:
   (i) co-ordinate data to precisely locate, orient, rotate, arrange in front to back order, modify object settings if any, and size each message element for the high resolution image;
   (ii) alpha data to precisely provide opacity for each message element of the high resolution image; and
   (iii) color data to precisely provide color when selected, enabling the second processor to construct the high resolution image message element from the pre-process data in at least two layers, while forming a text report to act as a reference point for proofing the high resolution image.

2. The method of claim 1, wherein high resolution is at least 50 dpi at full scale for substrates larger than 5 feet by 10 feet.

3. The method of claim 1, wherein high resolution is at least 300 dpi for offset printing.

4. The method of claim 1, wherein the network is selected from the group: a satellite network, a fiber optic network a cellular network, the internet, a LAN, a Virtual private network, a similar network or combinations thereof.

5. The method of claim 1, wherein the substrates are selected from the group: offset printing substrates, digital printing substrates, screen printing substrates, ink jet printing substrates, photographic paper, films, membranes, laminates, substrates for embossing, substrates used for etching, substrates for engraving, substrates for embroidering, and combinations thereof.

6. The method of claim 1, wherein the at least one vector can be adjusted by at least one variable including the orientation of the vector, line thickness and combinations thereof.

7. The method of claim 1, wherein each layer of the message element can be adjusted by at least one variable.

8. The method of claim 7, wherein message elements comprising clip art or graphic backs can be adjusted by color, opacity, and wherein the corresponding preprocess data is included for a final output process.

\* \* \* \* \*